US012614479B2

(12) United States Patent
Kishan et al.

(10) Patent No.: US 12,614,479 B2
(45) Date of Patent: Apr. 28, 2026

(54) ELECTRONIC DEVICES WITH AMBIENT-ADAPTIVE DISPLAYS

(71) Applicant: Apple Inc., Cupertino, CA (US)

(72) Inventors: Harini Kishan, San Jose, CA (US); Ralf Habel, Cupertino, CA (US); Zhen Zhang, San Jose, CA (US); Yi Huang, San Jose, CA (US); Miguel Angel Lopez Alvarez, San Diego, CA (US); Shobhit Chaudhry, Sunnyvale, CA (US); Pavel V Dudrenov, San Francisco, CA (US); Gilles M Cadet, Agoura Hills, CA (US); Ping-Yen Chou, Santa Clara, CA (US); Yang Li, San Jose, CA (US); Kevin Cossu, Sunnyvale, CA (US); Alfred B Huergo Wagner, Redwood City, CA (US); Seung Wook Kim, San Jose, CA (US); Felipe Bacim De Araujo E Silva, San Jose, CA (US); Jessica Murphy, La Mesa, CA (US); Lincoln-Shaun Sanders, San Francisco, CA (US); Francisco H Imai, San Jose, CA (US); Jiaying Wu, San Jose, CA (US); Juan He, San Jose, CA (US); Jackson K Roland, San Jose, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 18/537,216

(22) Filed: Dec. 12, 2023

(65) Prior Publication Data

US 2025/0022392 A1 Jan. 16, 2025

Related U.S. Application Data

(60) Provisional application No. 63/513,766, filed on Jul. 14, 2023.

(51) Int. Cl.
*G09G 3/00* (2006.01)

(52) U.S. Cl.
CPC ..... *G09G 3/001* (2013.01); *G09G 2320/0626* (2013.01); *G09G 2360/144* (2013.01)

(58) Field of Classification Search
CPC .......... G09G 3/001; G09G 2320/0626; G09G 2360/144
See application file for complete search history.

(56) References Cited

U.S. PATENT DOCUMENTS 11,030,973 B2 * 6/2021 Moore .................... G06F 3/013
11,435,583 B1 9/2022 Pedder et al.

(Continued)

FOREIGN PATENT DOCUMENTS

KR 20190095671 A 8/2019
KR 20200001233 A 1/2020
WO WO-2022060605 A2 * 3/2022 ......... G02B 27/0172

OTHER PUBLICATIONS

Daedalus, 2022 (Year: 2022).*

*Primary Examiner* — Nelson M Rosario
(74) *Attorney, Agent, or Firm* — Treyz Law Group, P.C.; Kendall P. Woodruff

(57) ABSTRACT

A head-mounted device may have an inner display that displays images for a user and an outer display that informs nearby people of the status of the user and inner display. For example, the outer display may display an image of a face, an abstract layer, or both, depending on whether the inner display is operating in passthrough mode, mixed reality mode, or virtual reality mode. An ambient light sensor in the head-mounted device may be used to measure the brightness and color of ambient light. The white point of the face layer on the outer display may be adapted to the color of ambient light, whereas the white point of the abstract layer on the outer display may remain fixed. The white point of a display (Continued)

may be a correlated color temperature setting (e.g., measured in degrees Kelvin) that determines the warmth or coolness of displayed colors.

10 Claims, 7 Drawing Sheets

(56) References Cited

U.S. PATENT DOCUMENTS

| | | | |
|---|---|---|---|
| 2015/0070337 | A1 | 3/2015 | Bell et al. |
| 2016/0018655 | A1 | 1/2016 | Imoto et al. |
| 2016/0055822 | A1 | 2/2016 | Bell |
| 2016/0116979 | A1 | 4/2016 | Border |
| 2016/0328875 | A1 | 11/2016 | Fang et al. |
| 2017/0068500 | A1 | 3/2017 | Rochford et al. |
| 2018/0004478 | A1 | 1/2018 | Chen |
| 2018/0324177 | A1 | 11/2018 | Wang |
| 2019/0041642 | A1* | 2/2019 | Haddick ............ G02B 27/0075 |
| 2019/0384062 | A1 | 12/2019 | Wilson et al. |

* cited by examiner

ELECTRONIC DEVICES WITH AMBIENT-ADAPTIVE DISPLAYS

This application claims the benefit of patent application No. 63/513,766, filed Jul. 14, 2023, which is hereby incorporated by reference herein in its entirety.

FIELD

This relates generally to electronic devices and, more particularly, to electronic devices with input-output components.

BACKGROUND

Electronic devices sometimes include optical components. For example, a wearable electronic device such as a head-mounted device may include a display for displaying an image.

Conventional head-mounted devices tend to isolate users from their surroundings. As a result, interactions between a user that is wearing a head-mounted device and people in the user's environment may be extremely limited or non-existent. For example, there is often no way for a person standing next to a user wearing a head-mounted device to discern the user's emotions or to recognize the identity of the user.

SUMMARY

An electronic device such as a head mounted device may have an inner display that displays an image for a user through lenses. Head-mounted support structures may be used to support the display and lenses. One or more outer displays on the head-mounted support structures may be publicly viewable while the head-mounted device is being worn.

The outer display on the head-mounted device may be used to inform nearby people of the status of the user wearing the head-mounted device. When the inner display is operating in passthrough mode, the outer display may display an image of a face to inform nearby people that the user is attentive to the user's real-world surroundings. When the inner display is operating in mixed reality mode, the outer display may display the face image overlaid with an abstract layer to inform nearby people that the user is at least partially attentive to the real-world environment but is also viewing virtual content. When the inner display is operating in virtual reality mode, the outer display may display the abstract layer without the face image to inform nearby people that the user is fully immersed in a virtual world. The white point of the face layer may be adapted to the color of ambient light, whereas the white point of the abstract layer may remain fixed. The white point of a display may be a correlated color temperature setting (e.g., measured in degrees Kelvin) that determines the warmth or coolness of displayed colors.

A tinted layer over the ambient light sensor may help reduce infrared interference with ambient light measurements. The tinted layer may be coated with an ink layer that hides the ambient light sensor while still allowing sufficient visible light to be transmitted for ambient light sensor measurements. The ambient light sensor may be angled away from the outer display and recessed relative to the tinted layer to reduce display interference with ambient light sensor measurements.

DETAILED DESCRIPTION

Figure 1:
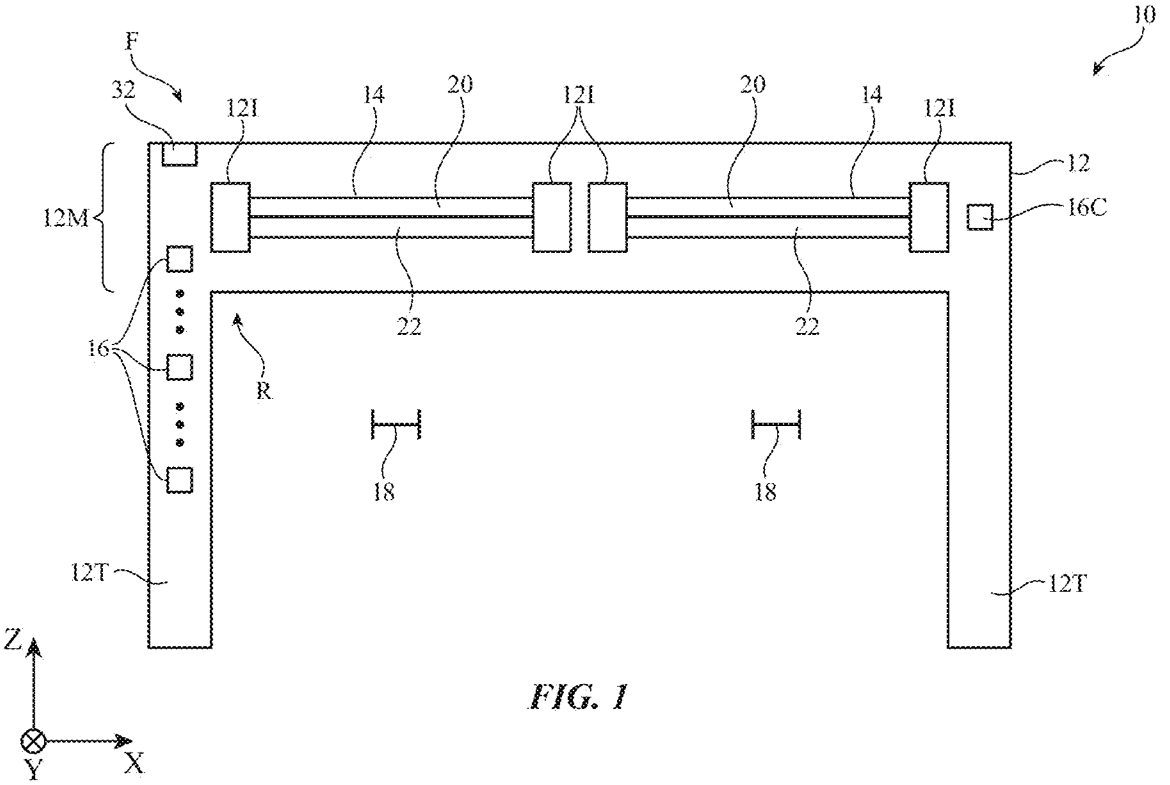
FIG. 1 is a top view of an illustrative electronic device such as a head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portion (e.g., support structures 12T) to allow device 10 to be worn on a user's head. A main housing portion (e.g., support structure 12M) and associated internal housing portion (e.g., internal support structures 12I) may support the display, lenses, and other optical components (e.g., structures 12I may serve as lens support structures).

Front face F of housing 12 may face outwardly away from a user's head. Rear face R of housing 12 may face the user. During operation, a user's eyes are placed in eye boxes 18. When the user's eyes are located in eye boxes 18, the user may view content being displayed by display 14 through associated lenses 22. Display 14 faces inwardly toward eye boxes 18 and may therefore sometimes be referred to as a rear-facing display, an inner display, an inwardly facing display, a display that is not publically viewable, or a private display. Front face F of device 10 faces away from eye boxes 18 and faces away from lenses 22.

In some configurations, optical components such as display 14 and lenses 22 are configured to display computer-generated content that is overlaid over real-world images (e.g., a user may view the real world through the optical components). In other configurations, which are sometimes described herein as an example, real-world light is blocked (e.g., by an opaque housing wall at front face F of housing 12 and/or other portions of device 10).

In addition to inwardly facing optical components such as inner display 14 and associated lenses 22 that allow a user with eyes in eye boxes 18 to view images, device 10 may have one or more displays and/or other light-emitting components (e.g., status indicator lights, illuminated button icons, etc.) that are located on exterior surfaces of device 10. Device 10 may, for example, have one or more external displays (sometimes referred to as outwardly facing displays or publically viewable displays) such as display 24 on front face F. Display 24 may present images that are viewable to people in the vicinity of the user while the user is wearing and while the user is using device 10 to view images on display 14. Display 24 may also be used to display images on the exterior of device 10 that are viewable by the user when device 10 is not being worn (e.g., when device 10 is resting in the user's hand or on a tabletop and is not on a user's head). Display 24 may be a touch sensitive display and/or may be a force sensitive display (e.g., display 24 or part of display 24 may overlap a finger sensor) or, if desired, display 24 may be insensitive to touch and force input. There may be one or more outwardly facing displays such as display 24 in device 10. Haptic output components may be overlapped by one or more of these outwardly facing displays or may be mounted elsewhere in housing 12 (e.g., to provide haptic output when a user supplies finger input such as touch input and/or force input to a portion of a display).

The support structures of device 10 may include adjustable components. For example, support structures 12T and 12M of housing 12 may include adjustable straps or other structures that may be adjusted to accommodate different head sizes. Support structures 12I may include motor-driven adjustable lens mounts, manually adjustable lens mounts, and other adjustable optical component support structures. Structures 12I may be adjusted by a user to adjust the locations of eye boxes 18 to accommodate different user interpupillary distances. For example, in a first configuration, structures 12I may place lenses and other optical components associated respectively with the user's left and right eyes in close proximity to each other so that eye boxes 18 are separated from each other by a first distance and, in a second configuration, structures 12I may be adjusted to place the lenses and other optical components associated with eye boxes 18 in a position in which eye boxes are separated from each other by a second distance that is larger than this distance.

In addition to optical components such as displays 14 and 24, device 10 may contain other electrical components 16. The electrical components of device 10 such as the displays and other electrical components 16 may include integrated circuits, discrete components, printed circuits, and other electrical circuitry. For example, these components may include control circuitry 16C and input-output devices.

Control circuitry 16C of device 10 may include storage and processing circuitry for controlling the operation of device 10. Control circuitry 16C may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 16C may be based on one or more microprocessors, microcontrollers, digital signal processors, baseband processors, power management units, audio chips, graphics processing units, application specific integrated circuits, and other integrated circuits. Software code may be stored on storage in control circuitry 16C and run on processing circuitry in control circuitry 16C to implement control operations for device 10 (e.g., data gathering operations, operations involving the adjustment of the components of device 10 using control signals, etc.). Control circuitry 16C in device 10 may include wired and wireless communications circuitry. For example, control circuitry 16C may include radio-frequency transceiver circuitry such as cellular telephone transceiver circuitry, wireless local area network (WiFi®) transceiver circuitry, millimeter wave transceiver circuitry, and/or other wireless communications circuitry.

Device 10 may be used in a system of multiple electronic devices. During operation, the communications circuitry of device 10 may be used to support communication between device 10 and other electronic devices in the system. For example, one electronic device may transmit video and/or audio data to device 10 or another electronic device in the system. Electronic devices in the system may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

The input-output devices of device 10 (e.g., input-output devices in components 16) may be used to allow a user to provide device 10 with user input. Input-output devices may also be used to gather information on the environment in which device 10 is operating. Output components in the input-output devices may allow device 10 to provide a user with output and may be used to communicate with external electrical equipment.

The input-output devices of device 10 may include one or more displays such as inner display 14 and external display 24. External display 24 may be formed from a liquid crystal display, organic light-emitting diode display, a display with an array of crystalline semiconductor light-emitting diode dies, or a display based on other types of pixels. In some configurations, a display in device 10 may include left and right display devices (e.g., display 14 may be formed from left and right components such as left and right scanning mirror display devices, liquid-crystal-on-silicon display devices, digital mirror devices, or other reflective display devices, left and right display panels based on light-emitting diode pixel arrays such as organic light-emitting display panels or display devices based on pixel arrays formed from crystalline semiconductor light-emitting diode dies, liquid crystal display devices panels, and/or or other left and right display devices in alignment with the user's left and right eyes, respectively). In other configurations, display 14 may include a single display panel that extends across both eyes or may use other arrangements in which content is provided with a single pixel array.

The display(s) of device 10 may be used to display visual content for a user of device 10. The content that is presented on display 14 may, for example, include virtual objects and other content that is provided to the display by control circuitry 12 and may sometimes be referred to as computer-generated content. An image on the display such as an image with computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display).

The input-output circuitry of device 10 may include sensors. The sensors may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source such as an infrared light source that emits one or more beams of light that are tracked using the image sensor after reflecting from a user's eyes), touch sensors, buttons, capacitive proximity sensors, light-based (optical) proximity sensors, other proximity sensors, force sensors such as strain gauges, capacitive force sensors, resistive force sensors and/or other force sensors configured to measure force input from a user's fingers or other external objects on a display, track pad, or other input surface, sensors such as contact sensors based on switches, gas sensors, pressure sensors, moisture sensors, magnetic sensors, audio sensors (microphones), ambient light sensors, light sensors that make user measurements, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors (e.g., two-dimensional capacitive fingerprint sensors, two-dimensional optical fingerprint sensors, etc.), and/or other sensors.

Sensors in device 10 may include an ambient light sensor such as ambient light sensor 32. Ambient light sensor 32 may be a color ambient light sensor having an array of detectors each of which is provided with a color filter. If desired, the detectors in ambient light sensor 32 may be provided with color filters of different respective colors. Information from the detectors may be used to measure the total amount of ambient light that is present in the vicinity of device 10. For example, the ambient light sensor may be used to determine whether device 10 is in a dark or bright environment. Based on this information, control circuitry 16 can adjust display brightness for display 14 and/or display 24 or can take other suitable action.

Color ambient light sensor 32 may be used to make ambient light intensity (e.g., brightness, illuminance, and/or luminance flux per unit area) measurements. Ambient light intensity measurements, which may sometimes be referred to as ambient light illuminance measurements, may be used by device 10 to adjust display brightness (as an example). Color ambient light sensors 32 may be used to make measurements of ambient light color (e.g., color coordinates, correlated color temperature, or other color parameters representing ambient light color). Control circuitry 16C may be used to convert these different types of color information to other formats, if desired (e.g., a set of red, green, and blue sensor output values may be converted into color chromaticity coordinates and/or may be processed to produce an associated correlated color temperature, etc.).

Color information and illuminance information from color ambient light sensor 32 can be used to adjust the operation of device 10. For example, the color cast (e.g., display white point) of display 14 and/or display 24 (e.g., the white point of display 14 and/or display 24) may be adjusted in accordance with the color of ambient lighting conditions. The white point of a display may be a correlated color temperature setting (e.g., measured in degrees Kelvin) that determines the warmth or coolness of displayed colors. If, for example, a user moves device 10 from a cool lighting environment (e.g., an outdoor blue sky environment) to a warm lighting environment (e.g., an incandescent light environment), the warmth of display 14 and/or display 24 may be increased accordingly, so that the user of device 10 does not perceive display 14 as being overly cold and/or so that people around the user wearing device 10 do not perceive display 24 as being overly cold. If desired, ambient light sensor 32 may include an infrared light sensor. In general, any suitable actions may be taken based on color measurements and/or total light intensity measurements (e.g., adjusting display brightness, adjusting display content, changing audio and/or video settings, adjusting sensor measurements from other sensors, adjusting which on-screen options are presented to a user of device 10, adjusting wireless circuitry settings, etc.).

To convey information about the user's emotions and other information about the user's appearance and thereby help connect the user to people around the user, display 24 and/or other output components may be used in conveying information about the user's state to people in the vicinity of the user. The information that is conveyed using publicly viewable display 24 and/or other output components may include information on the user's appearance such as information on the appearance of the user's eyes and/or other facial features, information on the user's physiological state (e.g., whether the user is perspiring, is under stress, etc.), information on the user's emotions (e.g. whether the user is calm, upset, happy, sad, etc.), and/or other information on the state of the user. The information may be conveyed visually (e.g., using display 24 and/or light-emitting components such as light-emitting diode status indicator lights, dedicated visual output devices such as devices that illuminate icons, text, one or more different eye-shaped symbols, etc. without using a full pixel array, etc.) and/or may be conveyed in other forms (e.g., using sound such as tones, synthesized voice, sound clips, etc.). Illustrative configurations for device 10 in which information on the state of the user is displayed visually using a publicly viewable display such as display 24 may sometimes be described herein as an example.

Because display 24 is publicly viewable, visual information displayed on display 24 can be used to convey information about the state of the user to people who can view display 24 (e.g., people in the vicinity of the user). These people might normally be able to interact with the user by virtue of observing the user's eyes and other facial features that are now being obscured by the presence of device 10. By placing appropriate information on display 24, control circuitry 16C can convey information about the user to others. The information may include text, graphics, and/or other images and may include still and/or moving content. The information that is displayed may be captured image data (e.g., captured images such as photographs and/or videos of facial features associated with the user) and/or may be computer-generated images (e.g., text, graphics such as user facial feature graphics, computer-processed photographs and/or videos, etc.). In some situations, information gathered by control circuitry 16C using input-output circuitry and/or wireless circuitry may be used in determining the content to be displayed on display 24.

The information displayed on display 24 may be real (e.g., a genuine facial expression) or may be artificial (e.g., a synthetic facial expression that does not represent a user's true facial expression). Configurations in which the images that are displayed on display 24 are representative of a user's true state help the user communicate with surrounding people. For example, if a user is happy, displaying a happy facial expression on display 24 will help the user convey the user's happy state to surrounding people. Configurations in which images that are displayed on display 24 are not representative of the user's true state may also be used to convey information to other people. If desired, a copy of the outwardly displayed facial expression or other publicly displayed information may be displayed on the user's private display (e.g., in a corner region of the display, etc.) so that the user is informed of the current outward appearance of device 10.

The use of display 24 may help a user convey information about the user's identity to other people. Consider, as an example, a scenario in which display 24 displays a photographic image of the user's facial features. The displayed facial features of the user may correspond to facial features captured in real time using an inwardly facing camera and/or may correspond to previously captured facial feature images (still and/or moving). By filling in portions of the user's facial features that are otherwise obscured due to the presence of device 10, display 24 may help people in the vicinity of the user recognize the identity and facial expressions of the user.

Facial features may be displayed using a 1:1 replication arrangement. For example, control circuitry 16C may use display 24 to display an image of the portion of the user's face that is covered by display 24 without magnification or demagnification. Perspective correction may be applied to displayed images so that an image that is displayed on display 24 slightly in front of the surface of the user's face (e.g., 1-10 cm in front) will appear as if it is located directly at the surface of the user's face. In other situations, processed and/or synthesized content may be displayed on display 24. For example, display 24 may be used to display user facial feature graphics (graphical representations of the facial features of a user of device 10) such as computer-generated eyes (e.g., graphics containing eyes that resemble the user's real eyes and/or that appear significantly different than the user's real eyes) and skin. The eyes may have a blink rate that tracks the user's measured actual blink rate. The user's blinks may be detected using an inwardly facing camera or other user monitoring sensor. The skin color that is displayed on display 24 may match the actual skin color of the user's face. If desired, the user's skin color may be captured with a camera in device 10 (or in another electronic device), measured with a color-sensitive light sensor, and/or may be determined based on user input. If desired, the computer-generated (control-circuitry-generated) eyes may have a computer-generated point-of-gaze that matches the user's measured point-of-gaze. The point-of-gaze may be measured using a gaze detection system in device 10. Other eye attributes may also be replicated such as pupil size or eye color. If desired, the eyes displayed on display 24 may have attributes that do not match the attributes of the user's eyes. For example, blink events, point-of-gaze, pupil size, eye color, and/or other eye attributes may be different for the computer-generated version of the eyes on display 24 than for the user's actual eyes.

Control circuitry 16C may adaptively adjust the skin color that is displayed on display 24 based on the color of ambient light measured with ambient light sensor 32. As the color of ambient light in the environment surrounding device 10 changes, control circuitry 16C may adaptively adjust the skin color that is displayed on display 24 to account for the chromatic adaptation of the human visual system to different illuminants. For example, control circuitry 16C may adaptively adjust the white point of display 24 based on the color of ambient light to make sure that the skin tone on display 24 is perceived to be consistent in both warm and cool ambient lighting environments.

To account for erroneous ambient light sensor readings without making overly conservative display white point adjustments, control circuitry 16C may determine or set a strength value for each sensor reading. The strength value may indicate how aggressively the display white point should be adjusted to match the measured ambient light color. For example, a strength value of zero may indicate that the white point should be set to a default white point regardless of ambient light color, whereas a maximum strength value may indicate that the white point should be as close as possible to the measured ambient light color. Lower strength values may be used when it is desired to be more conservative (e.g., when control circuitry 16C predicts that the sensor reading is inaccurate and/or when the confidence in the sensor reading is low). Higher strength values may be used when it is desired to be more aggressive (e.g., when control circuitry 16C predicts that the sensor reading is accurate and/or when the confidence in the model's classification of the sensor reading is high).

Outer display 24 may be configured to display different types of content depending on the display mode in which inner display 14 is operating. For example, in passthrough mode, captured camera images of the surrounding environment are displayed on inner display 14 without overlaid virtual display content. To inform nearby people that the user is viewing the surrounding environment on display 14, display 24 may be configured to display the user's face and eyes when device 10 is operating in passthrough mode. In mixed reality mode, both passthrough display content (captured camera images of the surrounding environment) and overlaid virtual image content may be displayed on display 14. To inform nearby people that the user is viewing the surrounding environment but is also viewing virtual image content, display 24 may be configured to display the user's face and eyes under an overlaid abstract layer (e.g., abstract shapes, colors, patterns, and/or other visual content without text or recognizable objects) when device 10 is operating in mixed reality mode. In virtual reality mode, the user is fully immersed in virtual image content on display 14 and is viewing little to no passthrough image content associated with the surrounding environment. To inform nearby people that the user is immersed in virtual reality content and is not attentive to the surrounding environment, display 24 may be used to display an abstract layer (without any face or eyes) when device 10 is operating in virtual reality mode.

If desired, control circuitry 16C may adapt the face layer on outer display 24 to the color of ambient light measured by sensor 32 without adapting the abstract layer on outer display 24 to the color of ambient light. This is merely illustrative, however. If desired, both the abstract layer and the face layer on outer display 24 may be adapted to the measured color of ambient light.

User input and other information may be gathered using sensors and other input devices in the input-output devices of device 10. If desired, device 10 may include haptic output devices (e.g., vibrating components overlapped by a display, portions of a housing wall, and/or other device structures), light-emitting diodes and other light sources, speakers such as car speakers for producing audio output, and other electrical components used for input and output. If desired, device 10 may include circuits for receiving wireless power, circuits for transmitting power wirelessly to other devices, batteries and other energy storage devices (e.g., capacitors), joysticks, buttons, and/or other components.

Some or all of housing 12 may serve as support structures (see, e.g., the portion of housing 12 formed by support structures 12T and the portion of housing 12 formed from support structures 12M and 12I). In configurations in which electronic device 10 is a head-mounted device (e.g., a pair of glasses, goggles, a helmet, a hat, etc.), structures 12T and 12M and/or other portions of housing 12 may serve as head-mounted support structures (e.g., structures forming a helmet housing, head straps, temples in a pair of eyeglasses, goggle housing structures, and/or other head-mounted structures). The head-mounted support structures may be configured to be worn on a head of a user during operation of device 10 and may support display(s), lenses, sensors, other input-output devices, control circuitry, and/or other components.

Figure 2:
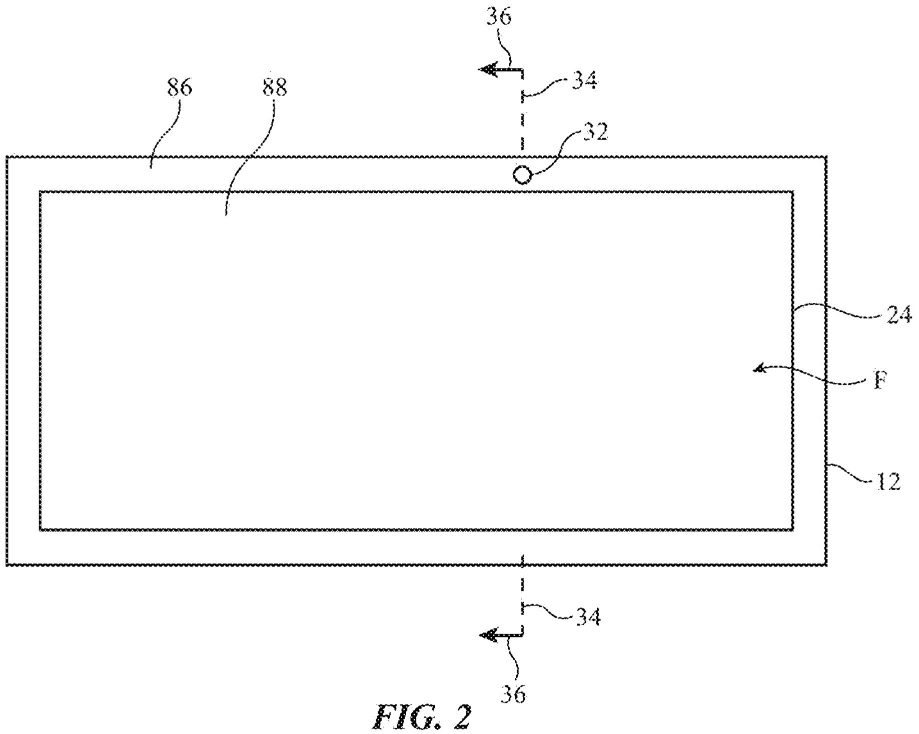
FIG. 2 is a front view of an illustrative electronic device with an area for a front-facing display and an ambient light sensor in accordance with an embodiment.

FIG. 2 is a front view of device 10 in an illustrative configuration in which front facing display 24 has been formed over most of front face F of housing 12. Sensors such as ambient light sensor 32 may be formed along one or more portions of the peripheral edge of housing 12 on front face F.

Display 24 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 24 forms an active area 88. Active area 88 may be used to display images. Active area 88 may be rectangular, may have a non-rectangular shape (e.g., a shape of a pair of goggles), or may have other suitable shapes. Inactive border area 86 may run along one or more edges of active area 88. Inactive border area 86 may contain circuits, signal lines, and other structures that do not emit light for forming images. Sensors such as ambient light sensor 32, flicker sensors, infrared sensors, cameras (e.g., visible light cameras, infrared light cameras, etc.), depth sensors, and/or other sensors may be mounted in inactive border area 86 on front face F, if desired.

To hide inactive circuitry (e.g., circuitry that does not include pixels for displaying images), sensors, and other components in border area 86 from view, the underside of a cover layer that covers display 24 (e.g., a cover glass layer, a tinted cover layer, or other cover layer on front face F) may be coated with an opaque masking material such as a layer of black ink. To accommodate optical components (e.g., a camera, a light-based proximity sensor, an ambient light sensor, status indicator light-emitting diodes, camera flash light-emitting diodes, etc.) that are mounted under inactive border area 86, one or more openings (sometimes referred to as windows) may be formed in the opaque masking layer of inactive region 86. For example, a light component window such as an ambient light sensor window may be formed in a peripheral portion of display 24 in inactive border area 86. The ambient light sensor window over sensor 32 may include ink having a higher transmission than the surrounding ink in inactive border 86 so that ambient light can reach sensor 32 while sensor 32 remains obscured by the ink.

As a user wears device 10 and views display content on inner display 14, outer display 24 may be used to inform nearby people of the status of device 10 and/or the status of the user wearing device 10. For example, display content on display 24 may be adjusted based on the operating mode of device 10 and/or the display mode of inner display 14. FIGS. 3, 4, 5, and 6 are front views of display 24 showing illustrative types of display content that may be displayed on outer display 24 during different operating modes of device 10 (e.g., during different display modes associated with inner display 14).

Figure 3:
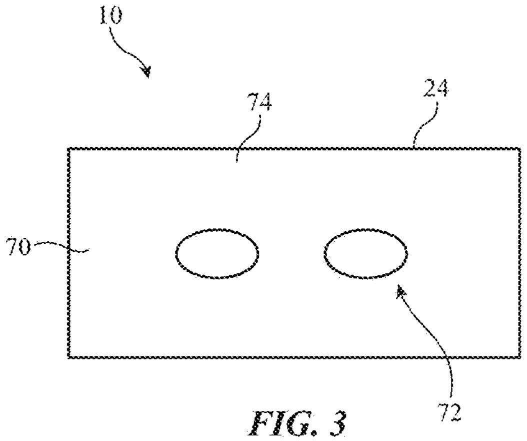
FIG. 3 is a front view of an illustrative electronic device with a front-facing display displaying content such as a face when an inner display in the electronic device is operating in a passthrough display mode in accordance with an embodiment.

In the example of FIG. 3, device 10 and inner display 14 are operating in passthrough mode. In passthrough mode, captured images of the user's environment are displayed on inner display 14 with minimal or no overlaid virtual image content. The user is therefore able to view the real-world environment on display 14 without any virtual distractions. In this type of scenario, outer display 24 may be used to display face layer 70 to let nearby people know that the user is aware of the real-world environment. In passthrough mode, face layer 70 may be displayed on display 24 with minimal or no overlaid image content. Face layer 70 may include camera-captured and/or computer-generated facial features such as skin 74 and eyes 72. Eyes 72 may track the user's gaze so that eyes 72 have a point-of-gaze that matches the actual user's point-of-gaze as the user views passthrough content on inner display 14. The color of skin 74 of face layer 70 may be based on user input or may be based on gathered sensor data (e.g., the user's skin color may be captured using an inward-facing camera or other sensor in device 10, using a camera in an external electronic device, using a color light sensor, and/or using other suitable sensors and/or user input). The skin color may be detected/determined during a dedicated enrollment process or may be gathered during normal use of device 10.

In passthrough mode, control circuitry 16C may adjust the color of skin 74 on outer display 24 based on the color of ambient light measured by ambient light sensor 32 to ensure that the skin color is perceived to be consistent under different illuminants. This may include, for example, adaptively adjusting the white point of face layer 70 to be colder (e.g., bluer) under cool ambient light illumination and to be warmer (e.g., redder) under warm ambient light illumination.

Control circuitry 16C may also adjust the brightness of skin 74 based on the brightness of ambient light. For example, control circuitry 16C may apply a dimming factor to face layer 70 in order to create a sunglasses effect in which skin 74 is visible but slightly darker as if covered by sunglasses. The dimming factor by which skin 74 is dimmed may be determined based on the measured ambient light brightness. For example, device 10 may store a look-up table that maps measured ambient light brightness values to dimming factors. The look-up table may be based on user studies or other data, if desired.

Since different skin tones may require different dimming factors to achieve the same sunglasses effect (even under the same illuminant), the look-up table may also account for the user's skin tone when mapping ambient light brightness to a dimming factor. A user's skin tone may be captured by a camera (e.g., an inward-facing camera in device 10, a forward-facing camera in device 10, a camera that is part of another electronic device, etc.). In particular, a face image (e.g., a captured image of the user's face) may have forehead regions and cheek regions from which an aggregate skin color can be extracted. The skin color may be represented in any suitable color space. In some arrangements, the skin color may be represented in a perceptually uniform color space such as Lab color space or Yu'v' color space. If desired, the look-up table that maps ambient light brightness values to dimming factors may account for both the luminance and the chrominance components of the user's skin color. In other arrangements, the look-up table may only account for the luminance component (e.g., the L component in Lab color space, the Y component in the Yu'v' color space, etc.) of the user's skin color without accounting for the chrominance component (as the chrominance component may be sufficiently captured within the luminance component). In this type of scenario, the look-up table may be a two-dimensional look-up table with measured ambient light brightness as a first input, the luminance component of the user's skin color as a second input, and a dimming factor (e.g., for achieving a sunglasses effect or any other desired dimming effect) as an output.

Figure 4:
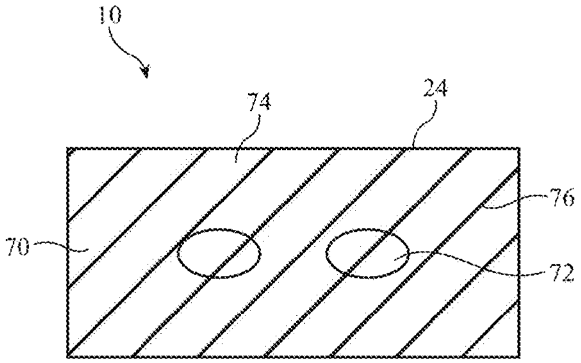
FIG. 4 is a front view of an illustrative electronic device with a front-facing display displaying content such as a face overlaid with an abstract layer when an inner display in the electronic device is operating in a mixed reality display mode in accordance with an embodiment.

In the example of FIG. 4, device 10 and inner display 14 are operating in mixed reality mode. In mixed reality mode, captured images of the user's environment are displayed on inner display 14, and virtual image content such as computer-generated virtual display elements are overlaid onto (e.g., layered with) the passthrough content. The user is therefore able to view the real-world environment on display 14 but may not be fully attentive to the real-world surroundings due to the presence of virtual content on display 14. In this type of scenario, outer display 24 may be used to display face layer 70 to let nearby people know that the user is aware of the real-world environment, and an additional layer such as abstract layer 76 may be overlaid onto (e.g., layered with) face layer 70. Abstract layer 76 may include abstract colors, shapes, patterns, content that is free of recognizable objects or text, and/or other display content.

In mixed reality mode, control circuitry 16C may adjust the color of skin 74 on outer display 24 based on the color of ambient light measured by ambient light sensor 32 to ensure that the skin color is perceived to be consistent under different illuminants. This may include, for example, adaptively adjusting the white point of face layer 70 to be colder (e.g., bluer) under cool ambient light illumination and to be warmer (e.g., redder) under warm ambient light illumination.

If desired, control circuitry 16C may adapt face layer 70 to the color of ambient light without adapting abstract layer 76 to the color of ambient light. For example, face layer 70 may have an adjustable white point that shifts with the color of ambient light (thereby allowing skin 74 and eyes 72 to be perceived as consistent under different illuminants), while abstract layer 76 may have a fixed white point that remains constant under different illuminants. While the white point of abstract layer 76 may remain fixed, the brightness of abstract layer 76 may be adjusted to adapt to the measured brightness of ambient light. This is merely illustrative, however. If desired, control circuitry 16C may adaptively adjust the white point of abstract layer 76 based on the color of ambient light. The strength value with which the white point of abstract layer 76 is matched to ambient light color may be less than the strength value with which the white point of face layer 70 is matched to ambient light color, if desired.

Figure 5:
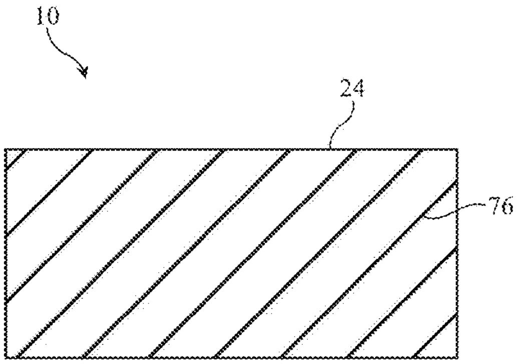
FIG. 5 is a front view of an illustrative electronic device with a front-facing display displaying content such as an abstract layer when an inner display in the electronic device is operating in a virtual reality display mode in accordance with an embodiment.

In the example of FIG. 5, device 10 and inner display 14 are operating in virtual reality mode. In virtual reality mode, most or all of the display content on display 14 is virtual content and/or other content that does not represent the user's current real-world environment. The user is fully immersed in a virtual world that is displayed on display 14 and is not attentive to the people or objects in the user's real-world environment. In this type of scenario, outer display 24 may be used to display abstract layer 76 to let nearby people know that the user is not aware of and/or cannot see the real-world environment. Abstract layer 76 may include abstract colors, shapes, patterns, content that is free of recognizable objects or text, and/or other display content. In virtual reality mode, abstract layer 76 may be displayed on display 24 with minimal or no overlaid image content (e.g., without face layer 70).

In virtual reality mode, abstract layer 76 may have a fixed white point that remains constant under different illuminant colors. This is merely illustrative, however. If desired, control circuitry 16C may adaptively adjust the white point of abstract layer 76 based on the color of ambient light when device 10 is operating in virtual reality mode.

Figure 6:
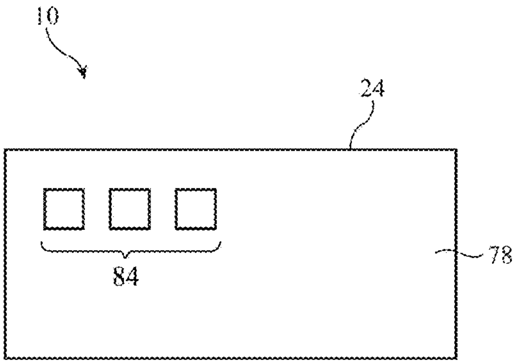
FIG. 6 is a front view of an illustrative electronic device with a front-facing display displaying content such as user interface elements in accordance with an embodiment.

In the example of FIG. 6, device 10 and inner display 14 are operating in an off state or a reboot state. For example, display 14 may be turned off, device 10 may be resting on a table or otherwise not on a user's head, and/or display 14 may be powering up after a reboot. In these and other scenarios, outer display 24 may be used to display user interface layer 78. User interface layer 78 may include user interface elements 84 (e.g., low battery icons, charging status icons, pairing status information, menu buttons, user-selectable on-screen options, user login information, authentication options, etc.).

User interface layer 78 may have a fixed white point that remains constant under different illuminant colors. This is merely illustrative, however. If desired, control circuitry 16C may adaptively adjust the white point of user interface layer 78 based on the color of ambient light.

Figure 7:
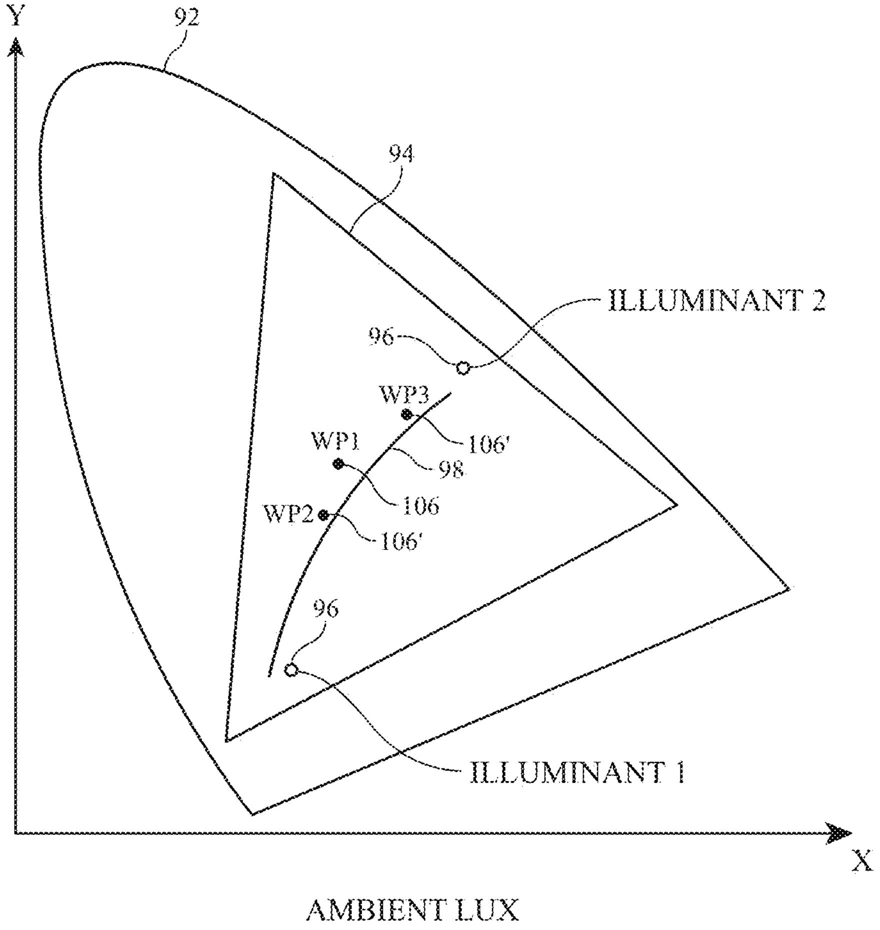
FIG. 7 is a chromaticity diagram illustrating how the white point of a display such as the outer display of FIGS. 1-6 may be adjusted based on the color of ambient light in accordance with an embodiment.

A chromaticity diagram illustrating how display 24 may have an adaptive white point that is determined at least partly based on ambient lighting conditions is shown in FIG. 7. The chromaticity diagram of FIG. 7 illustrates a two-dimensional projection of a three-dimensional color space (sometimes referred to as the 1931 CIE chromaticity diagram). The color generated by a display such as display 24 may be represented by chromaticity values x and y. The chromaticity values may be computed by transforming, for example, three color intensities (e.g., intensities of colored light emitted by a display) such as intensities of red, green, and blue light into three tristimulus values X, Y, and Z and normalizing the first two tristimulus values X and Y (e.g., by computing $x=X/(X+Y+Z)$ and $y=Y/(X+Y+Z)$ to obtain normalized x and y values). Transforming color intensities into tristimulus values may be performed using transformations defined by the International Commission on Illumination (CIE) or using any other suitable color transformation for computing tristimulus values.

Any color generated by a display may therefore be represented by a point (e.g., by chromaticity values x and y) on a chromaticity diagram such as the diagram shown in FIG. 7. Bounded region 92 of FIG. 7 represents the limits of visible light that may be perceived by humans (i.e., the total available color space). The colors that may be generated by a display are contained within a subregion of bounded region 92. For example, bounded region 94 may represent the available color space for display 24 (sometimes referred to as the color gamut of display 24).

Display 24 may be characterized by various calibration settings such as gamma and color temperature. The color temperature of display 24 determines the color cast of display 24. Although the color temperature setting of a display can affect the appearance of all colors, the color temperature setting of a display is sometimes referred to as the "white point" of the display because it is defined by the white color produced when all of the pixels in a display are operated at full power (e.g., when R=G=B=255). The white point of display 24 may be defined by an illuminant (e.g., D65, D50, or other illuminant), a color temperature (e.g., 6500 degrees Kelvin (K), 5000 K, or other color temperature), or a set of chromaticity coordinates. The color temperature of a light source refers to the temperature at which a theoretical black body radiator would emit radiation of a color most closely resembling that of the light source. Curve 98 illustrates the range of colors that would radiate from an ideal black body at different color temperatures and is sometimes referred to as the Planckian locus or black body locus. The color temperatures on black body curve 98 range from higher temperatures on the left (e.g., near the cooler hues around illuminant 1) to lower temperatures on the right (e.g., near the warmer hues around illuminant 2).

Control circuitry 16C may operate all or some of display 24 in an ambient-adaptive mode or a non-adaptive mode, if desired. As discussed in connection with FIGS. 3-6, ambient-adaptive adjustments may be made to some layers being displayed on display 24 without being applied to other layers that are displayed on display 24. For example, control circuitry 16C may adaptively adjust the white point of face layer 70 based on the color of ambient light, whereas the white point of abstract layer 76 and/or user interface layer 78 may remain fixed at a default white point (or may be adapted to ambient light using less aggressive strength values when compared to face layer 70). In mixed reality mode when abstract layer 76 is overlaid onto face layer 70 (see, e.g., FIG. 4), the white point of face layer 70 may be adjusted based on the ambient light color measured by sensor 32 (e.g., to adapted white point WP2 or WP3), while the white point of abstract layer 76 may remain fixed (e.g., at a default white point such as WP1). Control circuitry 16C may switch between ambient-adaptive mode and non-adaptive mode, may adjust the strength value which determines how aggressively the white point should match the measured ambient light color, and/or may adjust which layers on display 24 have an adaptive or fixed white point (e.g., based on sensor data, application information, display content, display mode, user input, settings, etc.).

The default white point 106 (WP1) of a given layer on display 24 (e.g., face layer 70, abstract layer 76, user interface layer 78, etc.) may be any suitable white point. For example, white point WP1 may be D65, D50, or any other suitable white color. If desired, white point WP1 may be selected and/or adjusted by the user. When a given layer on display 24 is not adapted to the color of ambient light, the white point of that layer on display 24 (e.g., the white point of an individual layer on display 24 such as abstract layer 76 and/or user interface layer 78) may remain fixed at WP1 even as the ambient lighting conditions change.

When a given layer on display 24 is adapted to the color of ambient light, control circuitry 16C may dynamically adjust the white point of that layer on display 24 (e.g., the white point of an individual layer on display 24 such as face layer 70) based on the color of ambient light. There may be certain ambient lighting situations where the default white point WP1 is appropriate. For example, when ambient light is neither overly cool nor overly warm, default white point WP1 may be a close match to the ambient light and may therefore be agreeable to viewers that are viewing display 24. However, under other ambient lighting conditions (e.g., under different illuminants such as illuminants 96 of FIG. 7), control circuitry 16C may adjust the white point of face layer 70 on display 24 to an ambient-adaptive white point (e.g., one of ambient-adaptive white points 106' of FIG. 7).

For example, under a first ambient illuminant 96 such as illuminant 1, control circuitry 16C may adjust the white point of face layer 70 on display 24 to ambient-adapted white point WP2 (represented by one of points 106'). Ambient-adapted white point WP2 more closely matches the color of illuminant 1 than default white point WP1. Under a second ambient illuminant 96 such as illuminant 2, control circuitry 16C may adjust the white point of face layer 70 on display 24 to ambient-adapted white point WP3 (represented by another one of points 106'). Ambient-adapted white point WP3 more closely matches the color of illuminant 2 than default white point WP1.

By adjusting the white point of face layer 70 on display 24 based on the color of ambient light, the color cast of skin 74 of face layer 70 will adapt to the different ambient lighting conditions just as the viewer's vision chromatically adapts to different ambient lighting conditions. For example, illuminant 2 may correspond to an indoor light source having a warm hue, whereas illuminant 1 may correspond to daylight or an indoor light source having a cool hue. Illuminant 2 may have a lower color temperature than illuminant 1 and may therefore emit warmer light. In warmer ambient light (e.g., under illuminant 2), control circuitry 16C can adjust the white point of face layer 70 on display 24 to ambient-adapted white point WP3, which in turn adjusts the color cast of skin 74 of face layer 70 to a warmer hue (i.e., light with a lower color temperature) than that which would be produced if the default white point WP1 were maintained as the display white point. This adaptive adjustment of face layer 70 ensures that skin tone 74 displayed on display 24 is perceived to be consistent under different ambient lighting conditions.

Ambient light sensor 32 may be used to measure both the ambient light level (e.g., in lux or luminance flux per unit area), as well as the ambient colorimetry (e.g., in CIE 1931 XYZ space or any other suitable color space). Control circuitry 16C may set a strength value for each sensor reading which indicates how aggressively the display white point should be adjusted to match the measured ambient light color. The strength value may range from zero to one, if desired. For example, a strength value of zero may indicate that the white point of a given layer on display 24 should be set to a default white point (e.g., D65 or other default white point WP1 of FIG. 7) regardless of ambient light color, whereas a maximum strength value (e.g., a strength value of 1) may indicate that the white point of a given layer on display 24 should be as close as possible to the measured ambient light color. Lower strength values may be used when it is desired to be more conservative (e.g., when the model predicts that the sensor reading is inaccurate and/or when the confidence in the model's classification of the sensor reading is low). Higher strength values may be used when it is desired to be more aggressive (e.g., when the model predicts that the sensor reading is accurate and/or when the confidence in the model's classification of the sensor reading is high).

Because skin color is more susceptible to perceived inconsistencies across different ambient illuminants, it may be desirable to set a relatively high strength value for white point adjustments to face layer 70 to ensure that the color of skin 74 is sufficiently adapted to the ambient light color. For example, control circuitry 16C may adapt the white point of face layer 70 on display 24 to the measured color of ambient light using a strength value of 0.5, 0.75, 0.9, greater than 0.5, greater than 0.9, or less than 0.9.

Figure 8:
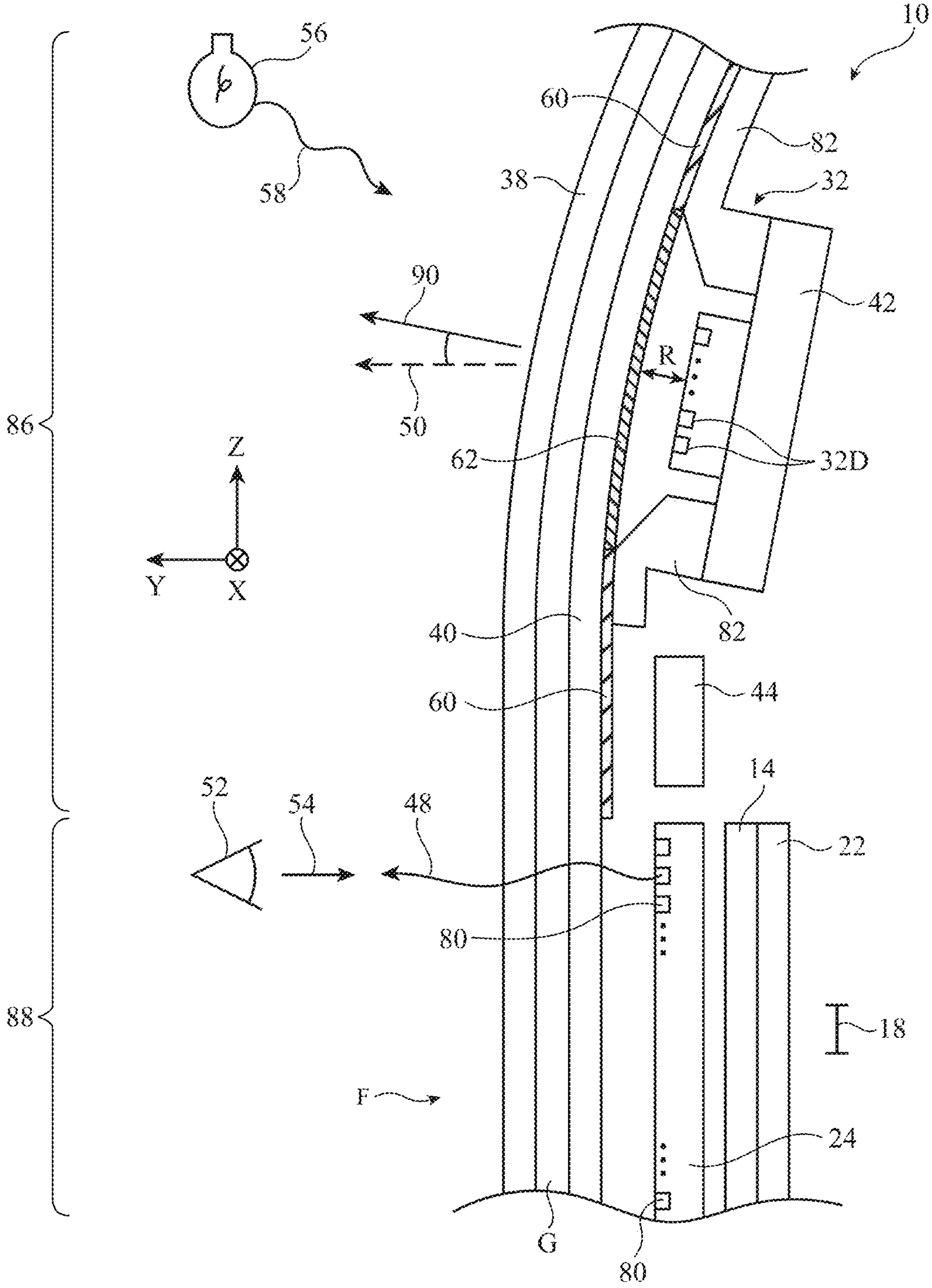
FIG. 8 is a side view of an illustrative electronic device having an inner display, an outer display, and an ambient light sensor in accordance with an embodiment.

In order to use higher strength values to more aggressively match the white point of face layer 70 to the measured color of ambient light, care must be taken to ensure that the ambient light sensor readings are accurate. For example, ambient light sensor 32 may be mounted in a location and angled in a direction helps mitigate crosstalk (e.g., interference) from display 24 and/or other sensors around the periphery of display 24 (e.g., other sensors in inactive area 86 of FIG. 2). Additionally, sensor 32 may be covered with one or more layers of material that reduce infrared light transmission and increase visible light transmission to sensor 32. FIG. 8 is a cross-sectional side view of device 10 (taken along line 34 of FIG. 2 and viewed in direction 36) showing an illustrative configuration for ambient light sensor 32 that helps increase the signal-to-noise ratio of sensor 32 while mitigating crosstalk from neighboring optical components such as display 24 and other sensors in inactive area 86.

As shown in FIG. 8, device 10 may include inner display 14 and outer display 24. When device 10 is being worn on a user's head, display 14 may be configured to display images that are viewable through lens 22 from eye box 18. Outer display 24 may be configured to display images in active area 88 that are viewable by people that are not wearing device 10. For example, outer display 24 may be viewed by viewer 52 in direction 54. Display 24 may include pixels such as pixels 80 that emit light 48 towards viewer 52.

Active area 88 may be bordered by peripheral inactive region 86. Inactive region 86 may form a ring-shaped border that loops around the periphery of display 24 on front face F. Input-output components such as sensors and other circuitry may be mounted in border region 86 and hidden from view using opaque masking material such as ink 60 and/or ink 62. For example, as shown in FIG. 8, ambient light sensor 32 may be mounted in border region 86. Other optical sensors such as flicker sensor 44 and infrared and/or visible light cameras may be mounted in border region 86.

Display 24 in active area 88 and sensors in border region 86 may be covered by one or more cover layers such as display cover layer 38 and tinted layer 40. Display cover layer 38 may be formed from glass, sapphire, polymer, and/or other suitable transparent materials and may serve as an outer protective layer for display 24 and other components in device 10. Display cover layer 38 may, for example, be formed from curved glass that has a convex outer surface facing viewer 52 and an opposing concave inner surface facing eye box 18. Display cover layer 38 may cover some, most, or all of front face F of device 10. As shown in FIG. 8, display cover layer 38 spans across display 24 in active area 88 and across sensors such as ambient light sensor 32 and flicker sensor 44 in inactive region 86.

Tinted layer 40 (sometimes referred to as tinted canopy 40) may be formed from polymer, glass, sapphire, and/or other suitable transparent materials and may serve to darken display 24 in active area 88 and to darken inactive area 86 on front face F (e.g., tinted layer 40 may transmit a lower percentage of visible light than cover glass 38). Tinted layer 40 may be interposed between cover layer 38 and display 24. Tinted layer 40 may also be interposed between cover layer 38 and ambient light sensor 32. If desired, an air gap G may be interposed between cover layer 38 and tinted layer 40 to help reduce display crosstalk from interfering with sensor 32. This is merely illustrative. If desired, cover layer 38 and tinted layer 40 may be laminated together without an intervening air gap.

Tinted layer 40 may, for example, be formed from curved polymer (e.g., polycarbonate or other plastic) having a convex outer surface facing viewer 52 and an opposing concave inner surface facing eye box 18. Tinted layer 40 may cover some, most, or all of front face F of device 10. As shown in FIG. 8, tinted layer 40 spans across display 24 in active area 88 and across sensors such as ambient light sensor 32 and flicker sensor 44 in inactive region 86.

Light sensor 32 may be formed from an integrated circuit (e.g., a silicon integrated circuit) and/or discrete light detecting components. In some arrangements, light sensor 32 may be a single-channel broadband photodetector (e.g., a photodiode) that detects light across the visible spectrum. In other arrangements, light sensor 32 may include multiple photodetectors to discriminate between different colors. For example, light detector 32 may have multiple photodetectors 32D each of which gathers and measures light in a different band of wavelengths. These bands of wavelengths, which may sometimes be referred to as channels or color channels, may overlap slightly with each other and may, if desired, provide continuous coverage of the visible light spectrum (and, if desired, portions of the infrared light spectrum and/or ultraviolet light spectrum). Each photodetector 32D may be overlapped by a corresponding thin-film interference filter with a desired light transmission spectrum and/or may be overlapped by a color filter formed from a layer of dye or pigment with a desired light transmission spectrum. The light transmission spectrum of each color filter may correspond to a band of wavelengths at a different location of the visible light spectrum or other desired portion of the light spectrum. For example, a red channel photodetector may have a color filter that passes red light wavelengths while blocking all other wavelengths. If desired, ultraviolet light sensitivity and/or infrared light sensitivity can be provided by incorporating ultraviolet and/or infrared channels into light detectors 32D. Arrangements in which light sensor 32 is used to make visible light measurements are sometimes described herein as an example.

In configurations in which light sensor 32 is formed from an integrated circuit, photodetectors 32D for different color channels can be distributed throughout the integrated circuit and, if desired, redundant photodetectors 32D (e.g., photodetectors measuring the same color of light) may be included in light sensor 32. As an example, photodetectors 32D may include photodetectors for three or more different color channels and each color channel may have one or more different individual photodetectors 32D for gathering a light measurement for that color channel. Supporting circuitry (e.g., switching circuitry, amplifier circuitry, analog-to-digital conversion circuitry, communications circuitry for supporting communications with control circuitry elsewhere in device 10, etc.) may be incorporated into an integrated circuit that contains photodetectors 32D or, if desired, some or all of this supporting circuitry for photodetectors 32D may be formed in one or more integrated circuits that are separate from photodetectors 32D.

The sensor reading produced by sensor 32 may be processed by control circuitry 16C and converted into a color value. The color value can be represented in any suitable format. For example, a color value may be represented using color coordinates, a color temperature, color values in a color space (e.g., CIE La*b* color space, XYZ color space, RGB color space, etc.), a correlated color temperature, spectral information (e.g., a visible light spectral information, infrared light spectral information, and/or ultraviolet spectral information).

Control circuitry 16C may gather ambient light sensor data from color ambient light sensor 32 to adaptively determine how to adjust display light and display colors on display 24 based on ambient lighting conditions. If desired, control circuitry 16C may control display 24 using other information such as time information from a clock, calendar, and/or other time source, location information from location detection circuitry (e.g., Global Positioning System receiver circuitry, IEEE 802.11 transceiver circuitry, or other location detection circuitry), user input information from a user input device such as a touchscreen (e.g., touchscreen display 24) or keyboard, etc.

Ambient light sensor 32 may be used to measure the color and intensity of ambient light 58 from light source 56 (e.g., an indoor light source, daylight, etc.). Control circuitry 16C may adjust the operation of display 24 based on the color and intensity of ambient light. In adjusting the output from display 24, control circuitry 16C may account for the chromatic adaptation function of the human visual system. This may include, for example, adjusting the white point of face layer 70 on display 24 based on the color and/or brightness of ambient light measured by ambient light sensor 32 as discussed in connection with FIG. 7. If, for example, a user moves device 10 from a cool lighting environment (e.g., outdoor light having a relatively high correlated color temperature) to a warm lighting environment (e.g., indoor light having a relatively low correlated color temperature), the "warmth" of display 24 may be increased accordingly by adjusting the white point of face layer 70 on display 24 to a warmer white (e.g., a white with a lower color temperature), so that the user of device 10 does not perceive the color of skin 74 on display 24 as being overly cold.

If care is not taken, display light 48 may influence the sensor reading from ambient light sensor 32, resulting in an erroneous sensor reading that does not accurately reflect ambient light color. Similarly, crosstalk from neighboring infrared light sensors/emitters (or from infrared emitters in external electronic devices such as other head-mounted devices, cellular telephones, tablet computers, etc.) can interfere with ambient light sensor readings. If this interference is not accounted for, erroneous ambient light sensor readings can lead to inappropriate display brightness and white point adjustments on display 24. On the other hand, being overly conservative with display brightness and white point adjustments to account for rare erroneous sensor readings may lead to insufficient display brightness and white point adjustments (and therefore inaccurate color of skin 74 on display 24).

To mitigate erroneous sensor readings without making overly conservative display white point adjustments, ambient light sensor 32 may be angled away from display 24, as shown in FIG. 8. In particular, ambient light sensor 32 may be angled in direction 90. Direction 90 may be angled at non-zero angle θ relative to axis 50. Axis 50 may be the direction that display light 48 is emitted outwardly from display 24 towards viewer 52. By angling sensor 32 away from the direction of display light 48, crosstalk from display light 48 may be less likely to interfere with ambient light sensor measurements. Additionally, since device 10 may generally be operated indoors where light source 56 is an overhead light source, angling sensor 32 upwards by angle θ (e.g., towards the ceiling or otherwise towards light source 56), the signal-to-noise ratio of sensor 32 may be increased. Angle θ may be 15 degrees, 10 degrees, 20 degrees, less than 20 degrees, more than 15 degrees, 30 degrees, 45 degrees, more than 45 degrees, or less than 45 degrees.

Crosstalk mitigation can also be achieved by mounting ambient light sensor 32 in a recessed configuration in which sensor 32 is separated from tinted cover layer 40 by a gap such as gap R. Ambient light sensor housing 82 may have a recessed opening that receives ambient light sensor 32. Ambient light sensor 32 may be mounted to a substrate such as flexible printed circuit substrate 42. By recessing sensor 32 relative to tinted layer 40, reflected display light 48 from pixels 80 may be less likely to reach sensor 32.

In addition to angling sensor 32 upwards at angle θ (e.g., away from display light 48 and towards ambient light 58) and recessing sensor 32 at depth R relative to tinted layer 40, the signal-to-noise ratio of ambient light sensor 32 can be increased by selecting materials to cover ambient light sensor 32 to reduce infrared transmission to ambient light sensor 32. For example, tinted cover layer 40 may be configured to absorb, reflect, or otherwise block some or all of infrared light from reaching sensor 32. This helps prevent infrared light from an external electronic (e.g., another head-mounted device, a handheld electronic device such as a cellular telephone or tablet computer, etc.) from interfering with ambient light sensor measurements gathered by sensor 32.

To hide sensors and other circuitry in border area 86 from view by viewer 52, the underside of cover layer 38, tint layer 40, and/or other cover layer may be coated with an opaque masking material such as a layer of black ink. For example, ink 60 may be formed on the concave inner surface of tinted layer 40 over sensors in border region 86 such as flicker sensor 44. Ink 60 may be configured to absorb, reflect, or otherwise block a high percentage of visible light so that flicker sensor 44 is not visible to viewer 52 through ink 60.

Ambient light sensor 32 may be hidden from view using a different ink such as ink 62. Ink 62 may be formed on the concave inner surface of tinted layer 40 over ambient light sensor 32. Ink 62 may have higher transmission in the visible spectrum than ink 60 to increase the signal-to-noise ratio of sensor 32. At the same time, ink 62 may block a certain percentage of visible light so that sensor 32 is not readily visible to viewer 52. Ink 62 may also match the appearance of ink 60 so that viewer 52 cannot readily discern a difference between ink 60 and ink 62. By slightly increasing the transmission of ink 62 relative to ink 60, more accurate ambient light sensor readings can be obtained using sensor 32 so that the white point of face layer 70 can safely be matched to the measured ambient light color using a relatively high strength value.

Due to the increased confidence in the accuracy of sensor readings from ambient light sensor 32, white point adjustments can be made even in low light conditions (e.g., ambient light levels less than 5 lux, 10 lux, etc.). This allows control circuitry 16C to adjust the white point of face layer 70 based on the measured ambient light color even when ambient light levels are very low.

Figure 9:
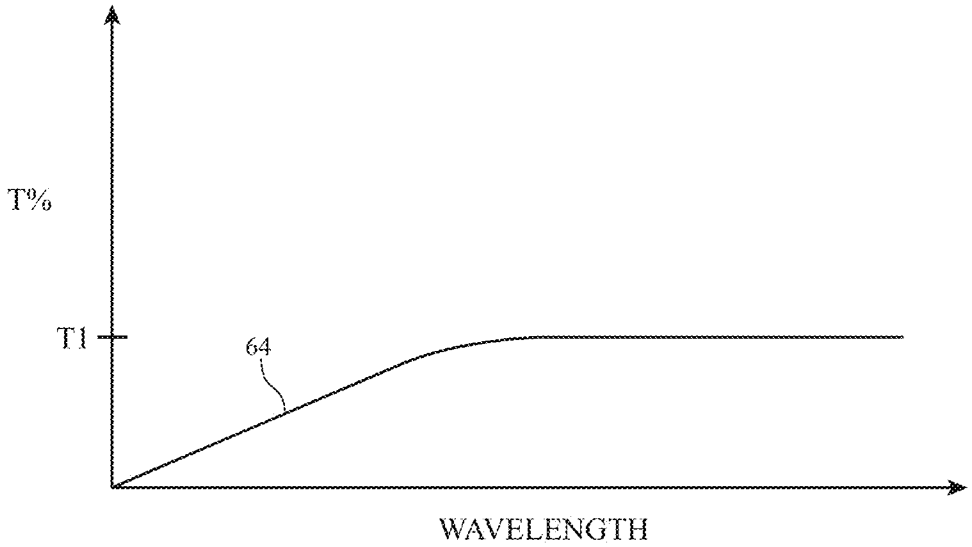
FIG. 9 is a graph showing an illustrative transmission curve for a tinted cover layer in accordance with an embodiment.

FIG. 9 is a graph showing an illustrative transmission curve associated with tinted layer 40. As illustrated by curve 64, tinted cover layer 40 may exhibit transmission percentage value T1 in the infrared spectrum. Value T1 across infrared wavelengths may be 15%, 30%, 20%, 10%, greater than 20%, or less than 20%. This helps increase the signal-to-noise ratio of sensor 32 by reducing interference from infrared light.

Figure 10:
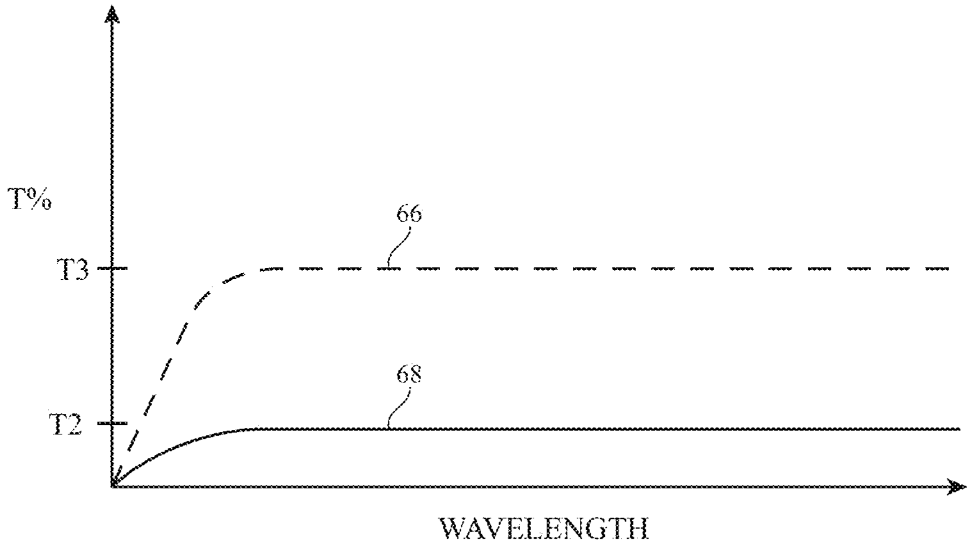
FIG. 10 is a graph showing illustrative transmission curves for different ink coatings covering different sensors in an electronic device in accordance with an embodiment.

FIG. 10 is a graph showing illustrative transmission curves associated with ink layers 60 and 62. As illustrated by curve 68, ink 60 may exhibit transmission percentage value T2 in the visible spectrum. Value T2 across visible wavelengths may be 0.5%, 1%, 2%, greater than 1%, or less than 1%. This helps block sensors in border region 88 such as flicker sensor 44 from view by viewer 52.

As illustrated by curve 66, ink 62 may exhibit transmission percentage value T3 in the visible spectrum. Value T3 across visible wavelengths may be 14%, 20%, 10%, greater than 10%, or less than 10%. This helps increase the signal-to-noise ratio of sensor 32 by increasing transmission of visible light through ink 62. Ink 62 may still block sufficient visible light so that sensor 32 remains hidden from view and so that ink 62 remains visibly indistinct from ink 60.

Figure 11:
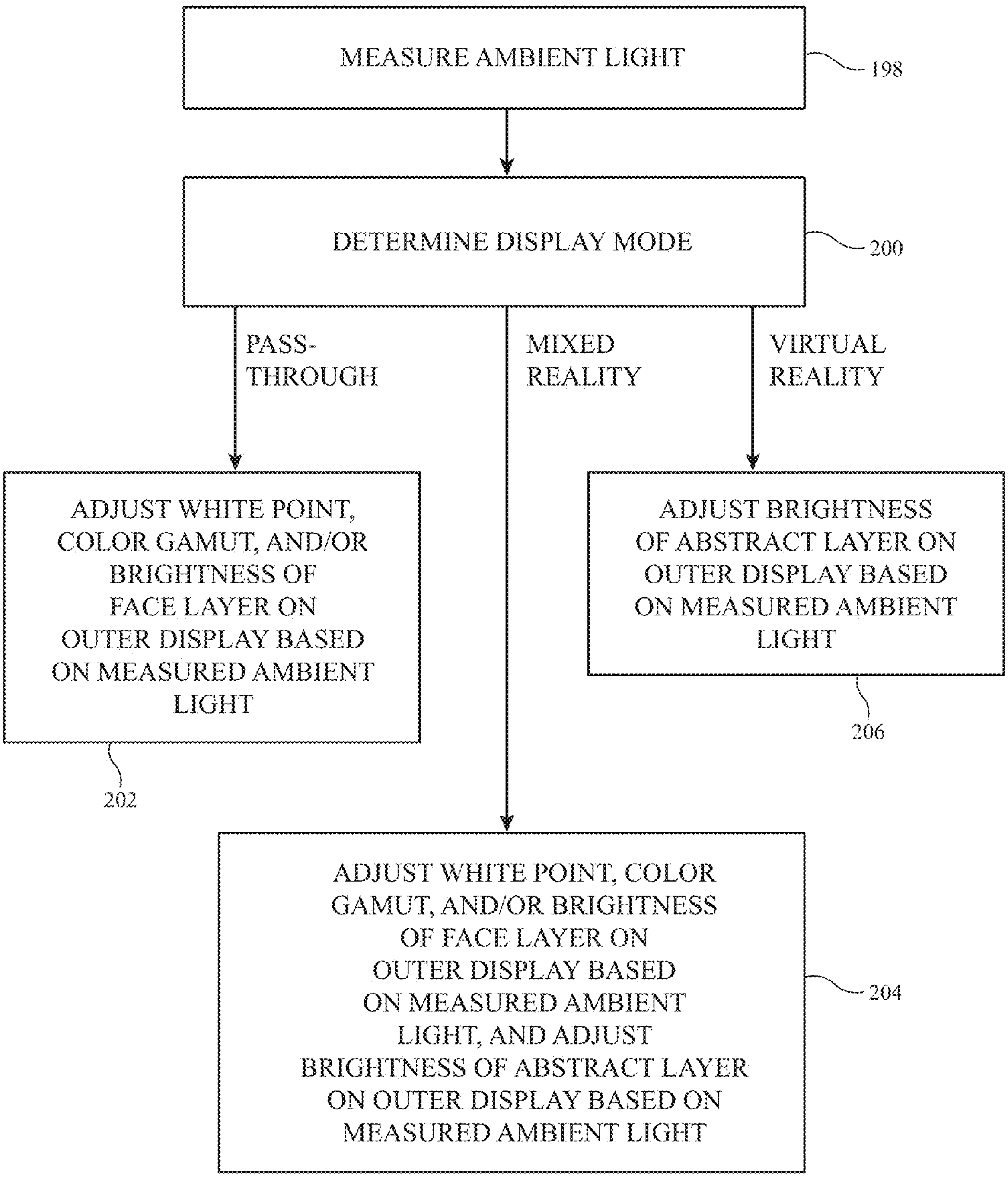
FIG. 11 is a flow chart of illustrative steps involved in adjusting an outer display based on ambient light measurements in accordance with an embodiment.

FIG. 11 is a flow chart of illustrative steps involved in operating device 10 to ensure that colors on outer display 24 (e.g., the color of skin 74 of face layer 70) are displayed appropriately under different ambient lighting conditions.

In the operations of block 198, control circuitry 16C may gather an ambient light sensor reading from ambient light sensor 32. The ambient light sensor reading may indicate a color and brightness of ambient light and may, if desired, be detected by sensor 32 through cover layer 38, tinted layer 40, and ink layer 62 of FIG. 8.

In the operations of block 200, control circuitry 16C may determine which display mode display 14 is currently operating in. For example, control circuitry 16C may determine whether display 14 is operating in passthrough mode, mixed reality mode, or virtual reality mode, as described in connection with FIGS. 3-6. In passthrough mode, captured camera images of the surrounding environment are displayed on inner display 14 without overlaid virtual display content. In mixed reality mode, both passthrough display content (captured camera images of the surrounding environment) and overlaid virtual image content may be displayed on display 14. In virtual reality mode, most or all of the display content on display 14 is virtual content and little to no passthrough content is displayed on display 14.

If display 14 is operating in passthrough mode, operations may proceed to block 202.

In the operations of block 202, display 24 may display face layer 70 (FIG. 3) without any overlaid abstract layer to inform nearby viewers (e.g., viewer 52 of FIG. 8) that the user wearing device 10 is fully attentive to the user's real-world surroundings. Control circuitry 16C may determine a display white point, brightness, and/or color gamut for face layer 70 on outer display 24 based on the ambient light sensor measurement gathered in block 198. For example, control circuitry 16C may pull the white point of face layer 70 on outer display 24 towards white point WP2 if the sensor reading indicates a first illuminant color 96 or may pull the white point of face layer 70 on outer display 24 towards white point WP3 if the sensor reading indicates a second illuminant color 96 (e.g., as shown in the example of FIG. 7). Due to the high confidence in sensor accuracy, the white point of face layer 70 may be more aggressively matched to the measured color of ambient light (e.g., using a strength value of 0.5 or greater, 0.9 or greater, etc.).

If display 14 is operating in mixed reality mode, operations may proceed to block 204.

In the operations of block 204, display 24 may display face layer 70 overlaid with abstract layer 76 (FIG. 4) to inform nearby viewers (e.g., viewer 52 of FIG. 8) that the user wearing device 10 is at least partially attentive to the user's real-world surroundings but is also viewing virtual content that could be distracting. Control circuitry 16C may determine a display white point, brightness, and/or color gamut for face layer 70 on outer display 24 based on the ambient light sensor measurement gathered in block 198. For example, control circuitry 16C may pull the white point of face layer 70 on outer display 24 towards white point WP2 if the sensor reading indicates a first illuminant color 96 or may pull the white point of face layer 70 on outer display 24 towards white point WP3 if the sensor reading indicates a second illuminant color 96 (e.g., as shown in the example of FIG. 7). Due to the high confidence in sensor accuracy, the white point of face layer 70 may be more aggressively matched to the measured color of ambient light (e.g., using a strength value of 0.5 or greater, 0.9 or greater, etc.).

Abstract layer 76 may be brightness-adapted without being color-adapted. For example, control circuitry 16C may adjust the brightness of abstract layer 76 based on the brightness of ambient light measured in block 198, but the white point of abstract layer 76 may remain fixed even as the color of ambient light in the environment changes. This is merely illustrative, however. If desired, abstract layer 76 may be adapted to the color of ambient light.

If display 14 is operating in virtual reality mode, operations may proceed to block 206. In the operations of block 206, display 24 may display abstract layer 76 (FIG. 5) without any overlaid face layer to inform nearby viewers (e.g., viewer 52 of FIG. 8) that the user wearing device 10 is fully immersed in a virtual world on display 14. Abstract layer 76 may be brightness-adapted without being color-adapted. For example, control circuitry 16C may adjust the brightness of abstract layer 76 based on the brightness of ambient light measured in block 198, but the white point of abstract layer 76 may remain fixed even as the color of ambient light in the environment changes. This is merely illustrative, however. If desired, abstract layer 76 may be adapted to the color of ambient light.

The foregoing is merely illustrative and various modifications can be made to the described embodiments. The foregoing embodiments may be implemented individually or in any combination.

What is claimed is:

1. A head-mounted device, comprising:
an inner display operable in first and second modes;
a lens through which the inner display is visible from an eye box;
an outer display that overlaps the inner display;
an ambient light sensor configured to measure a color and brightness of ambient light, wherein:
when the inner display is operating in the first mode, a white point of the outer display is adjusted based on the color of ambient light, and
when the inner display is operating in the second mode, the white point of the outer display is fixed at a default white point; and
a tinted cover layer overlapping the outer display and the ambient light sensor.

2. The head-mounted device defined in claim 1 wherein the first mode is a passthrough display mode and the second mode is a virtual reality display mode, wherein the outer display is configured to display first content when the inner display is operating in the passthrough display mode and second content when the inner display is operating in the virtual reality display mode, and wherein the first content is different from the second content.

3. The head-mounted device defined in claim 2 wherein the first content comprises an image of a face and the second content comprises an abstract layer without the image of the face.

4. A head-mounted device, comprising:

an inner display operable in a passthrough display mode and a virtual reality display mode;

a lens through which the inner display is visible from an eye box;

an outer display that overlaps the inner display, wherein the outer display is configured to display first content when the inner display is operating in the passthrough display mode and second content when the inner display is operating in the virtual reality display mode, wherein the first content is different from the second content; and an ambient light sensor configured to measure a color of ambient light, wherein a white point of the outer display is adapted to the color of ambient light when the inner display is operating in the passthrough display mode and wherein the white point of the outer display is fixed at a default white point when the inner display is operating in the virtual reality display mode.

5. The head-mounted device defined in claim 4 further comprising:

a tinted layer overlapping the outer display and the ambient light sensor;

a curved cover glass overlapping the tinted layer; and first and second inks on an inner surface of the tinted layer, wherein the first ink overlaps the ambient light sensor and transmits a greater percentage of visible light than the second ink.

6. The head-mounted device defined in claim 4, wherein:

the outer display is configured to display a first layer overlaid with a second layer when the inner display is operating in a mixed reality mode, and a first white point of the first layer is adjusted based on the color of ambient light while a second white point of the second layer remains fixed.

7. The head-mounted device defined in claim 6 wherein the first layer comprises a face layer including an image of a face and the second layer comprises an abstract layer that is overlaid onto the image of the face.

8. The head-mounted device defined in claim 6 wherein the ambient light sensor is angled away from the outer display.

9. The head-mounted device defined in claim 6 further comprising:

a tinted cover layer that overlaps the outer display and the ambient light sensor, wherein the tinted cover layer reduces a transmission of infrared light to the ambient light sensor.

10. The head-mounted device defined in claim 9 further comprising first and second inks on an inner surface of the tinted cover layer, wherein the first ink overlaps the ambient light sensor and transmits a greater percentage of visible light than the second ink.

* * * * *